United States Patent [19]
dePierne et al.

[11] Patent Number: 5,139,614
[45] Date of Patent: Aug. 18, 1992

[54] STYRENE/ACRYLIC-TYPE POLYMERS FOR USE AS SURFACE SIZING AGENTS

[75] Inventors: Otto S. dePierne, E. Norwalk; David L. Dauplaise, Norwalk; Robert J. Proverb, Danbury, all of Conn.

[73] Assignee: American Cyanamid Company, Stamford, Conn.

[21] Appl. No.: 709,254

[22] Filed: Jun. 3, 1991

Related U.S. Application Data

[62] Division of Ser. No. 651,168, Feb. 6, 1991, Pat. No. 5,122,568.

[51] Int. Cl.$^5$ ............................................. D21H 19/20
[52] U.S. Cl. ................. 162/135; 162/168.1; 427/391
[58] Field of Search ..................... 162/168.1, 135; 427/391

[56] References Cited

U.S. PATENT DOCUMENTS 2,851,448  9/1958  Slocombe et al. ............ 526/318.45
4,481,244  11/1984  Haruta et al. ....................... 428/155

FOREIGN PATENT DOCUMENTS 2142777  3/1973  Fed. Rep. of Germany .
61252209  11/1986  Japan .

Primary Examiner—Joseph L. Schofer
Assistant Examiner—M. Nagumo
Attorney, Agent, or Firm—Frank M. Van Riet

[57] ABSTRACT

A process is disclosed for the preparation of styrene/acrylic type polymers which are useful in the sizing of paper. The process comprises polymerizing the monomers in an alcohol/water mixture at reflux temperature in the presence of a free-radical generating catalyst. The catalyst is added portion-wise over the course of the reaction and the resultant polymer is neutralized while substantially simultaneously separating the alcohol/water mixture and adding water to recover a product of less than 25% polymer solids.

7 Claims, No Drawings

STYRENE/ACRYLIC-TYPE POLYMERS FOR USE AS SURFACE SIZING AGENTS

This application is a division of copending application Ser. No. 07/651,168 filed Feb. 6, 1991 now U.S. Pat. No. 5,122,568.

BACKGROUND OF THE INVENTION

The production of polymers based on acrylic monomers and styrene monomers is well known in the art. U.S. Pat. No. 3,983,268, for example, teaches the production of such polymers from, for example, methacrylic acid and styrene to produce highly random copolymers which are water-soluble. The process comprises slowly adding the styrene monomer to the entire concentration of the methacrylic acid monomer over the course of the reaction. The resultant polymers are neutralized with a base such as a caustic alkali and used with such materials as urea, dimethyl acetamide etc. as sizing agents for paper. U.S. Pat. No. 4,481,244 likewise teaches the production of polymers from such as monomers as styrene, acrylic acid and butyl acrylate using an isopropanol/water mixture as a solvent for the monomers and ammonium persulfate as the catalyst via an emulsion polymerization process. The monomers are added drop-wise over the course of the polymerization. Likewise, U.S. Pat. No. 4,628,071 teaches an emulsion polymerization process for the production of such polymers wherein a chain transfer agent is employed as is a gradual addition of monomers over the course of the polymerization.

The '071 process is complex to carry out. Furthermore, the immediate product is not an effective size per se and must be neutralized by a further complex series of steps. When completed, the final product has been found to possess unacceptable sizing properties due possibly to: a) its composition or b) to the difficulty of removing the original surfactants (which form the emulsion and are detriments to effective sizing) from the end product.

While it is the intent of all of these processes to produce a polymer having a substantially random configuration, because of the widely divergent reactivity ratios of the monomers, especially styrene and methacrylic acid, the methacrylic acid always tends to polymerize more rapidly and the styrene less rapidly, thus resulting in polymers wherein the initial sections of polymer are rich in methacrylic acid and the latter sections of polymer are rich in styrene. Attempts to get the monomers to react equally whereby the content of each in any particular section of the polymer chain will be substantially the same have proven less than successful.

Accordingly, the search for a process for the production of highly random polymers from these monomers continues and the discovery of such would fill a long-felt need in the industry.

SUMMARY OF THE INVENTION

It has now been found that substantially uniformly random polymers of such monomers as styrene and methacrylic acid can be produced if a combination of critical process steps and conditions are followed during the polymerization thereof. These critical process steps encompass 1) the use of a carefully chosen solvent mixture of alcohol and water, 2) an optimum molar ratio of the hydrophobic and hydrophilic monomers, 3) a suitable catalyst, 4) the addition of the catalyst portion- wise over the course of the reaction and 5) the substantially simultaneous removal of solvent mixture and neutralization and dilution of the polymer. These steps and conditions function cooperatively to result in a polymer product which functions as a sizing agent for alkaline paper more effectively than those made in accordance with the procedures of the prior art.

The products of the instant process impart substantial resistance to penetration of ink and aqueous liquids to said paper, increase its surface smoothness, provide processing flexibility by allowing the papermaker to balance the size requirements between internal and surface sizing, increase the contact angle and surface strength, maintain the sizing level over time, increase the coefficient of friction, form a hard, discontinuous film and develop complete sizing at the reel. As a result, print quality is improved, feathering and ink show-through are reduced, sharper half-tone dots are produced with maximized light scatter for improved print contrast, sheet properties are better controlled and of improved quality, wet-end operation is more efficient, linting and milking on offset press blankets are reduced, size regression is reduced, slip characteristics and handling problems associated therewith are reduced or eliminated, sheet drying is unaffected, quality control is improved and the need for external curing is eliminated.

DESCRIPTION OF THE INVENTION

Including Preferred Embodiments

Sizing is a technique which renders paper resistant to the penetration of fluids. Paper may be sized to a variety of degrees and for a variety of purposes. Thus, writing paper is sized to prevent the spread of ink, while milk carton stock is sized to retain the strength of the carton and, of course, to prevent any fluid flow through the carton walls and edges.

Sizing is carried out after sheet formation by a surface application or before sheet formation using an internal size added in the head box area.

Many different materials have been employed commercially as surface sizes including synthetic products based on styrene-maleic anhydride (SMA) copolymers and naturally occurring materials such as wax and as internal sizes such as alkenylsuccinic anhydride, alkylketene dimer or rosen.

Surface treatment can be applied to paper as either a post production operation or as a portion of the papermaking process itself. Surface size is applied typically in the papermaking process after the paper sheet has been formed and dried but not passed through a calendar stack. The formed and dried sheet (web) is conducted through a size press (actually a nip-coater of various configurations) which re-wets the sheet to some degree (depending on the type of size press) with a starch solution, a starch/surface size solution, or a water/surface size solution. Upon the wetting or coating of the web, it is again dried and subsequently passed through a series of nips at the calendar to control caliper and smooth the finished sheet prior to wind-up and slitting or sheeting Surface treatment is applied by papermakers for a variety of reasons, all related in some way to improved quality control of the paper. Thus, starch is applied to the web to improve the sheet surface characteristics. Surface size treatment alters the paper web in that it usually imparts an increased degree of hydrophobicity. This sizing effect translates into higher ink penetration time values and moreover, correlates to less feathering and reduced lateral spread of printing inks, producing improved imaging and contrast.

A need exists for an inexpensive surface size that is more efficient than those based on SMA, particularly as paper manufacture shifts to the alkaline side and the use of non-impact printing with ink-jet equipment continues to grow.

The process of the present invention results in a copolymer of, for example, styrene and methacrylic acid, which, after neutralization, is an unusually effective surface size.

The process comprises:

1) forming a homogeneous solution of:
(i) a monomer having the formula:

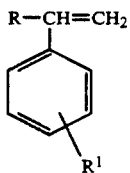

wherein R is hydrogen or $C_1$–$C_4$ alkyl and $R^1$ is hydrogen, halo or $C_1$–$C_4$ alkyl;

(ii) acrylic acid or methacrylic acid and (iii) optionally, a hydrophobic monomer different from that represented by said formula, the ratio of (i) to (ii) ranging from about 1.4:1 to about 1:1.4, the amount of (iii) being such as to replace up to about 10%, by weight, based on the total monomer weight, of (i) and/or (ii) and the solvent for said solution comprising a mixture of water and an unsubstituted hydrocarbon alcohol which can be separated from said water;

2) heating said homogenous solution to reflux in the substantial absence of oxygen and in the presence of from about 1 to about 3%, by weight, based on the weight of said monomers, of a water-soluble catalyst which generates sufficient free-radicals during the polymerization, until the weight average molecular weight of the resultant polymer is at least about 30,000 as determined by high performance size exclusion chromatography (HPSEC), said catalyst being added to said solution portion-wise such that the first portion is sufficient to only initiate polymerization of said monomers and the remaining portions are added over the course of said heating;

3) neutralizing a sufficient amount of the polymerized acid moieties of the resultant polymer while substantially simultaneously A) separating the alcohol/water mixture and B) adding sufficient water to produce no more than a 25% polymer solids solution and 4) recovering the resultant polymer solution.

Suitable monomers falling within the scope of the above formula include styrene, 2-methylstyrene; 2-ethylstyrene; 2-propylstyrene; o, m or p-chorostyrene; o,m or p-bromostyrene; o, m or p-iodostyrene; o, m or p-methylstyrene; o,m or p-ethylstyrene; o, m or p-t-butylstyrene and the like.

Examples of hydrophobic monomers represented by monomer (iii) include the acrylate and methacrylate alkyl ($C_1$–$C_4$) esters such as methylacrylate; ethylacrylate; propylacrylate; n-butylacrylate; methylmethacrylate; ethylmethacrylate; t-butylmethacrylate etc, acrylonitrile; vinylidene chloride; vinyl acetate; vinyl chloride; and the like.

The ratio of the styrene monomer to the (meth)acrylic acid monomer must range from about 1.4:1 to about 1:1.4, preferably about 1.2:1 to 1:1:2 and more preferably about 1:1. Up to about 10%, by weight, based on the total monomer weight, of either the styrene monomer or (meth)acrylic acid monomer or both can be replaced by the hydrophobic monomer. Preferably up to 5%, by weight, same basis, is used.

The alcohol/water solvent mixture is critical and any alcohol which can be separated from admixture with water can be used. Preferred are those lower, unsubstituted hydrocarbon, non-tertiary alcohols of not more than four carbon atoms which have a boiling point less than that of water, such as methanol; ethanol; n-propanol; isopropanol; sec-butanol; etc. The ratio of alcohol to water in the solvent mixture is such that a substantially homogeneous mixture of the monomers to be polymerized is obtained when added thereto. The ratio differs for each monomer combination however, a ratio of alcohol to water of from about 1:1 to about 4:1, more preferably from about 2:1 to about 3:1, is sufficient.

The catalyst employed is a water-soluble free-radical generating catalyst which generates sufficient free radicals, preferably, substantially at the reflux temperature of the polymerization reaction Suitable catalysts include ammonium persulfate; peracetic acid; hydrogen peroxide; perbenzoic acid and the like. These catalysts are well known to those skilled in the art and any such catalyst may be used. Amounts ranging from about 1.0% to about 3.0%, by weight, based on the weight of the monomers are illustrative The catalyst is employed in the instant process in a critical manner. Initially, only sufficient catalyst is added to the monomer solution of initiate the polymerization. Thereafter, the catalyst is added portion-wise over the course of the reaction at a rate to maintain a substantial concentration of free radicals during the polymerization process such that the monomers are continuously consumed over the course of the reaction at a substantially equal rate and substantially consumed by the end of the reaction.

It is necessary to conduct the polymerization process in the substantial absence of oxygen. Removal of oxygen can be conducted by sparging the reaction vessel and ingredient charges made thereto with nitrogen or other known means.

The reaction is conducted substantially at reflux and is continued until the weight average molecular weight of the resultant polymer is at least 30,000 as determined by HPSEC.

Once the molecular weight has been attained, the acid moieties of the polymer are neutralized by conversion to their salts such as to render the polymer water-soluble. Such bases as ammonium hydroxide, free organic amines or a caustic alkali such as potassium hydroxide; sodium hydroxide etc. can be used. It is preferred that the neutralization be effected using potassium hydroxide until the polymer can form an aqueous solution i.e at least about 60%; preferably 75%, of the acid moieties have been converted to their salts and then using ammonium hydroxide to finish the neutralization up to about 90%, preferably 100%.

It is critical that the alcohol be separated from the reaction medium while the neutralization of the acid moieties is being carried out. That is to say, no more than about 20% of the acid moieties can be neutralized before separation of the alcohol/water mixture begins although said separation can be started, before neutralization commences. The separation is preferably conducted via atmospheric distillation; vacuum distillation; steam distillation, or other means of rectification, although any other means may be employed such as the decantation of the supernatant solvent.

Substantially simultaneous to the alcohol separation, water is added so as to dilute the resultant polymer product to less than about 25% solids, preferably than about 15% solids.

The polymers produced by the above-described process have unique structural characteristics by virtue of the dynamics of the process. Under normal conditions polymers composed of acrylic type monomers when combined with styrenic type monomers give rise to an uneven incorporation of the monomers into the final polymer structure, as discussed above. This can be clearly seen in the published reactivity ratio data for both styrene/acrylic and styrene/methacrylic acid polymers The differing relative rates of incorporation of these monomers into a growing polymer chain generally produces a block type polymer in which the initial part of the polymer chain is enriched in the more reactive monomer and the end of the polymer chain is enriched in the less reactive monomer. Therefore, under normal conditions copolymers of different monomers of dissimilar reactivities produce polymers of a non-random nature. The process described in Example 1, below, is specifically designed to produce a polymer from monomers of dissimilar reactivities which has a high degree of randomness in the incorporation of the monomers into the polymerizing polymer backbone. Among the factors which are thought to increase the degree of randomness in polymers made by this process include:
1. The fact that a solvent is used in which all monomers are completely soluble This requires a careful balance of the water to alcohol ratio to achieve solubility of monomers of different solubilities such as styrene and acrylic acid 2. The reaction is carried out at elevated temperatures and is both initiated and continued by addition of slugs or aliquots of catalyst By maintaining high temperatures and using portionwise addition of catalyst, a relatively large number of free radical initiating species is present during the progress of the reaction A strong indication of the high degree of randomness present in the products of the instant invention is that measurement of the monomer incorporation (by direct measure of residual monomer) during the reaction progress indicates that the monomers are incorporated into the polymer uniformly throughout the polymerization. Data in Table 1, below, show the amount of residual monomers remaining at different times in the reaction progress.

Using the data generated by the reaction described in Example 3, reactivity ratios for the styrene monomer (r1) and the methacrylic acid monomer (r2) are calculated as follows: $r1 = 1.11$ and $r2 = 1.13$.

Literature references (Polymer Handbook; J. Brandrup and E. H. Immergut Editors; 2nd Edition; J. Wiley and Sons Inc. 1975; pp II-235) indicate that the known reactivity ratios for styrene (r1) and methacrylic acid (r2) range from $r1 = 0.15$, $r2 = 0.70$) to ($r1 = 0.63$, $r2 = 0.47$). None of the reactivity ratios cited reflect the data as generated by Example 3. Since the known reactivity ratios of styrene and methacrylic acid indicate that the styrene would be consumed at a slower rate than the methacrylic acid, it is logical to presume that known polymerization processes should not yield a 1:1 random copolymer composition This fact is reflected in the typical copolymerization reaction procedure as described in Example 5, where unequal feeds of the monomers are utilized to allegedly overcome this fact.

However, as the experimental data in Table I clearly illustrates, using the instant process both the stryene monomer and the (meth)acrylic acid monomer are consumed at nearly identical rates, thereby providing a polymer composition having monomer units incorporated therein as if the monomers from which said units are derived had reactivity ratios 1) nearly equal and 2) a multiplication product approaching unity.

The product of the instant invention may be applied as such to alkaline paper by direct addition to the size press system. Application of from about 0.1 to about 0.3%, as real polymer, per ton of paper, can be made, although porous sheets require greater amounts in order to achieve the same level of aqueous resistance. The polymer should be thoroughly mixed with the application solution, e.g. starch, but agitation should be controlled in order to minimize foaming and air entrainment. Anti-foaming agents may be added, as is usual, at dosages of about 100–150 ppm, preferably just prior to where foam is normally generated.

The size press solution should be maintained at a pH of 7.5–8.5. The size is most efficiently used when penetration into the alkaline paper is minimized, such as by maintaining internal size of the sheet at an optimum level.

The size effectiveness can be quantified by ink penetration and Bristow wheel evaluations. The TAPPI test for ink penetration is noted below. The Bristow wheel is described in Svensk Paperrstid, 1967, 70(19), 623 and TAPPI 1982, 65(12), 98–101.

The following examples are set forth for purposes of illustration only and are not to be construed as limitations on the present invention except as set forth in the appended claims. All parts and percentages are by weight unless otherwise specified. All tests are conducted on 45 lb. ink jet copy grade machine-made alkaline basesheets.

EXAMPLE 1

A suitable reaction vessel is fitted with a stirring apparatus, a water cooled reflux condenser, a thermocouple temperature probe, a nitrogen inlet, and dual inlets for subsequent additions to the vessel after the initial charges In addition, the inlet where the nitrogen is initially added is seated with a rubber septum The reaction vessel is placed in a heating bath.

The reaction vessel is charged with the following ingredients: styrene, 104.15 parts; methacrylic acid, 86.06 parts; isopropanol (IPA), 220 parts; and water, 90 parts. Preheated hot water is added to the bath and nitrogen is bubbled through the mixture under gentle agitation. The temperature of the vessel is raised to 85° C. and held for 45 minutes for the nitrogen sparge to substantially displace all of the oxygen in the reactor.

In a separate vessel, 5 parts of ammonium persulfate (APS) are dissolved into 20 parts of deionized water and sparged with nitrogen while stirring This solution is sparged initially- for 40 minutes.

1.05 Parts of the sparged APS solution are quickly added to the reaction mixture at reflux. 0.52 Part of the APS is then added after 45 min. have elapsed and again 0.52 part of the APS is added after 90 min. have elapsed. From 120 min. to 180 min., 0.52 part aliquots of the APS solution are added at 30 minute intervals. At 240 min. into the reaction, 0.67 part of the APS solution is added followed in 30 min. by the final APS charge of 0.75 part.

After refluxing for an additional 30 minutes, the reflux condenser is removed and replaced with a distillation head equipped with a thermometer and fittings connecting it to a standard condenser with a pre-weighed receiver The $N_2$ purge is discontinued.

A 15% solution of KOH is slowly charged to the polymer in the reaction at a rate roughly twice the rate of distillate removal. A pressure of 560 torr is drawn on the system (which is slowly lowered to 415 torr). At 290 min. into the reaction, the KOH charge is complete (280.53 parts) representing neutralization of 75% of the equivalent methacrylic acid available. Water is then added at a rate roughly 3 times the slowing distillation rate. The pressure is slowly lowered to 295-310 torr. An additional 215 parts of water are added slowly so as to avoid cooling the distilling polymer liquid. Distillation is discontinued when 295 parts of the IPA/water distillate have been removed. The heat and vacuum are discontinued after 350 minutes into the reaction and a charge of 87.6 parts of 10% $NH_4OH$ solution is added to complete the neutralization after the polymer has cooled to about 65° C. Additional water is added reducing the solids content to 14-17%.

A substantially syrupy liquid is obtained having a flash point of over 200° C. and a pH of between 9.0 and 10.0.

EXAMPLE 2

The procedure of Example 1 is again followed, however the distillation is carried out at atmospheric pressure and is achieved by increasing the reaction vessel temperature from 85° C. to 88°-92° C. KOH neutralization is about 15% complete before the distillation begins. In addition, at 390 minutes into the reaction, steam, partially dried of condensate by means of a trap, is sparged through the polymer during mixing, thus reducing the level of residual isopropanol.

A substantially clear polymer liquid is obtained as in Example 1.

The products of Examples 1 and 2 produce high levels of ink holdout as measured by the TAPPI ink penetration test. Table A, below, indicates the relative performance of the products versus commercially available surface sizing polymers. The table is an average of a large number of determinations (~100).

TABLE A

Performance Comparison (Per TAPPI Ink Penetration Test) between Materials from Examples 1 and 2 and Commercially Available Surface Size Agents

| Polymer | Typical Ink Penetration Values (sec) | |
|---|---|---|
| | 2#/Ton | 4#/Ton |
| Polymer from Examples 1 and 2 | 504 | 678 |
| Styrene/Maleic Type | 73 | 71 |
| *Modified Styrene/Maleic (Type I) | 227 | 275 |
| **Modified Styrene/Maleic (Type II) | 285 | 434 |
| Polyurethane | 323 | 407 |

*Half Amide/Ammonium Salt
**Half Sec-Butyl Ester

EXAMPLE 3

In the same manner as described in Example 2, a reaction is run using styrene (ST) (43.74 parts); methacrylic acid (MAA) (36.16 parts); isopropanol (92.4 parts); water (25.2 parts) and ammonium persulfate (1.76 parts). Samples of the reaction mixture are withdrawn periodicially, the polymer precipitated and the residual solution analyzed by gas chromatography. The data in Table I show that within experimental error, the rate of the consumption of both monomers is essentially identical, indicating that a random copolymer is formed.

TABLE I

| TIME (MIN) | ST MOLES (× 100) | MAA MOLES (× 100) |
|---|---|---|
| 0 | 42.10 | 41.98 |
| 40 | 34.51 | 39.00 |
| 70 | 26.36 | 30.74 |
| 133 | 26.55 | 30.97 |
| 135 | 26.93 | 31.20 |
| 168 | 22.94 | 26.84 |
| 198 | 21.43 | 25.24 |
| 285 | 10.43 | 12.62 |
| 345 | 13.27 | 11.47 |
| 380 | 8.91 | 10.09 |
| 415 | 4.55 | 5.51 |
| 450 | 3.81 | 3.90 |
| 1030 | 0.85 | 1.38 |

EXAMPLE 4

(Comparative)

The procedure of Example 2 is again followed but a t-butanol/$H_2O$ solvent system is employed using a hot oil bath instead of a hot water bath.

After polymerization, distillation proceeds for 90 min. until an abrupt and rapid rise in the head temperature indicates the t-butanol has been completely removed.

The resulting polymer is recovered and tested as a paper size, see Table VII.

EXAMPLE 5

(Comparative)

A suitable reaction vessel is fitted with a stirring apparatus, a water cooled condenser thermocoupled in the vessel and a nitrogen inlet through a rubber septum. Nitrogen purges are also supplied to both a second vessel containing a 5.5% solution of ammonium persulfate and two addition vessels.

The reaction vessel is charged with 87.74 parts of $H_2O$; 1.52 parts of the ammonium salt of a sulfated nonyl phenoxypolyethyleneoxy ethanol (SPEE) and 2.84 parts of the disodium ethoxylated alcohol ($C_{10}$-$C_{12}$) ester of sulfosuccinic acid (ESA) (surfactant). heel is slowly heated in a water bath to 75° C. while the $N_2$purge continues. The persulfate solution (as described in Example 1) is purged concurrently.

A methacrylic acid (MAA) pre-charge, a 50/50 blend with water, (11.19 parts of MAA and 11.19 parts of $H_2O$) is also sparged with nitrogen and held in an addition funnel.

The MAA/$H_2O$ charge is added to the reaction heel and initiation is begun by adding the persulfate solution at 0.038 part/min (total addition is 8.0 parts over 3 hrs. and 30 min.) The initiation is begun 5 min. after the heel and MAA/$H_2O$ charges are at 79° C.

An emulsion monomer charge containing 104.15 parts of styrene; 74.87 parts of methacrylic acid; 1.52 parts of SPEE; 1.42 parts of ESA and 106.07 parts of water is placed overhead in an addition funnel with an $N_2$ sparge. Addition of the monomer emulsion charge begins 10 min. after initiation has begun and continues for 2.5 hrs.

The resulting emulsion styrene/MAA copolymer is recovered and tested as a size for paper, see Table VII.

EXAMPLE 6

Items A (Styrene), B (Methacrylic acid), C (Isopropanol), and D (water) are each charged to suitable reaction vessels at the levels indicated in Table II and initiated with an ammonium persulfate solution as per the schedule in Examples 1 and 2. Neutralization is carried out subsequently to 75% equivalence with KOH solution as per Examples 1 and 2 and completed with NH$_4$OH. Isopropanol is decanted prior to neutralization.

Machine-made paper sheets containing various levels of internal sizing (either alkenylsuccinic anhydride or alkylketene dimer) which had been previously run through a water bath at the size press (and therefore had no prior surface treatment) are die-cut to 7"×7" sheets. A starch solution (A) is prepared by making a 20% solids slurry of starch in water and heating the mixture to 95° C. for 40 min while undergoing stirring. The starch solution is diluted with water to 3% solids and pH adjusted to 7 2–7.9 using a 0.1 N solution of NaOH or a 0.1 N solution of HCl.

The dilute starch solution A is measured into 500 part aliquots and either dosed with sizing polymer (real as a function of dry starch pickup on the paper sheets) or used as is. The dose of sizing polymer is pounds of real sizing polymer per ton of dry paper.

The 7"×7" paper sheet is passed through the starch (size) solution, placed between felts and roller pressed at 1½lb weight.

The paper sheet is then removed from the felts and dried on a heated (116° C.) drum dryer with a dwell drying cycle of 30 sec.

The tub-sized paper specimens are conditioned at 50% relative humidity and at ambient temperature a minimum of 24 hrs. prior to ink penetration testing in accordance with ASTM test T530pm-83; Provisional Method—1975; Revised 1983. Results in Table II indicate the effect of monomer ratio on polymer performance.

TABLE II

| RE-ACTION | MOLE RATIO A/B | % WT A | % WT B | % INK PENETRATION* 2# T | 4# T |
|---|---|---|---|---|---|
| 1 | 1:5 | 20 | 80 | 2.6 | 2.6 |
| 2 | 1:4 | 24 | 76 | 3.5 | 4.4 |
| 3 | 1:3 | 29 | 71 | 3.3 | 4.0 |
| 4 | 1:2 | 38 | 62 | 36.7 | 44.3 |
| 5 | 1:1 | 55 | 45 | 100.0 | 100.0 |
| 6 | 2:1 | 71 | 29 | 13.8 | 8.4 |
| 7 | 3:1 | 78 | 22 | Insoluble | |

*% Ink Penetration reflects the following: The highest Ink Penetration in sec. is set at 100%. All other Ink Penetration values are reflected as percentages of the highest value.

EXAMPLE 7

The polymerization reaction of Example 1 is again carried out. Atmospheric distillation is carried out with addition of KOH by a rate roughly equivalent to the distillation rate. KOH neutralization is carried to the 70% equivalence rate followed by NH$_4$OH to an additional 20% equivalence level leaving 10% of the equivalence methacrylic acid unneutralized.

The polymer liquid obtained is slightly cloudy. It is recovered and tested as a paper size, see Table VII.

EXAMPLE 8

Items A (styrene), B (methyl methacrylate) and C (methacrylic acid) are charged and polymerized in 250 parts of isopropanol and 48.75 parts of deionized water solution with a 22% ammonium persulfate solution added as an initiator as in Examples 1 and 2 as set forth below in Table III. Neutralization is accomplished during the stripping with a 14% solution of NaOH to a 75% equivalence point and ammonia (10% solution) to the remaining equivalence of methacrylic acid.

Ink penetration values are obtained with each polymer following the procedure of Example 6, above. The values are set forth as a percentage of the best achieved in Example 6.

TABLE III

| REAC-TION | MOLE RATIO A: | B: | C | WT % A | B | C | INK PENETRATION |
|---|---|---|---|---|---|---|---|
| 1 | 0.9 | 0.1 | 1.0 | 49.37 | 5.27 | 45.36 | 90% |
| 2 | 0.8 | 0.2 | 1.0 | 43.98 | 10.57 | 45.45 | 82% |
| 3 | 1.0 | 0.1 | 0.9 | 54.34 | 5.22 | 40.44 | 94% |
| 4 | 1.0 | 0.2 | 0.8 | 53.97 | 10.37 | 35.66 | 79% |
| 5 | 1.0 | — | 1.0 | 55 | — | 45 | 100% |
| 6 | 1.2 | — | 0.8 | 6.45 | — | 35.5 | 81% |

EXAMPLE 9

(Comparative)

A suitable reaction vessel is charged with 42.0 parts of styrene and 34.4 parts of methacrylic acid. The mixture is sparged with nitrogen for 1 hr. and simultaneously heated in a steam bath to 70° C. In a second vessel, a mixture of 0.4 part of ammonium persulfate, 0.5 part of water and 0.5 part of methacrylic acid is sparged with N$_2$. The sparged mixture is added to the first vessel containing the heated, sparging monomer solution which is also slowly mixed and the heated solution is removed from the steam bath and allowed to react. After 2 hours the polymer obtained has an unusually high viscosity, estimated to be 200,000 cps at 40°–450° C., and the resulting polymer is elastomeric.

A KOH solution (15%) is slowly added to the polymer sufficient to neutralize the methacrylic acid to 75%, then followed by NH$_4$OH (10% solution) completing neutralization. The resultant polymer liquid is recovered and tested as a paper size, see Table VII.

EXAMPLE 10

(Comparative)

Two polymerizations are carried out. Suitable vessels, fitted as described in Example 1 are charged with 104.15 parts of styrene; 72.06 parts of acrylic acid, and 180 parts of isopropanol (IPA). In Reaction A, 60 parts of water are then added and in Reaction B, 45 parts of water are added (see Table IV). The monomer mixtures are sparged with nitrogen for 1 hr. and the vessel temperatures are raised to reflux. An 8.8% solution of ammonium persulfate is sparged for both Reactions A and B with N$_2$ for 1 hr. The Reactions are initiated by addition of the total APS solution and refluxed 3 hrs. The results are set forth in Table IV, below.

TABLE IV

| REACTION | IPA/H$_2$O RATIO IN INITIAL CHARGED | RESIDUAL MONOMER (BY HPLC) AA | STYRENE |
|---|---|---|---|
| A | 3:1 | 6.3% | 2.16% |
| B | 4:1 | 1.53% | 9.54% |

The comparison of reactions illustrates the role that the isopropanol/water ratio plays in determining residual monomer and thereby the degree of inhibition in the reaction

EXAMPLE 11

(Comparative)

Using a reaction vessel fitted as per Example 1, a charge of 1.56 parts of styrene (ST) and 4.0 parts of isopropyl alcohol (IPA) is added and sparged 60 min. with $N_2$ while heating to 83° C. Then separate charges A (8.86 parts of styrene and 6.5 parts of IPA), B (7.21 parts of acrylic acid (AA), 2.14 parts of IPA and 6.0 parts of water) and C (8.36 parts of IPA, 1.0 part of water, 0.01 part of 2,2'-azobis(2-methylpropanenitrile) (AMPN) are added by steady feed, over a 4 hr. period followed by 75% neutralization with NaOH and 25% with $NH_4OH$ on an equivalent basis. See Table V, below, for results.

TABLE V

| ST/AA RATIO | IPA/$H_2O$ INITIATOR RATIO | INITIATOR | RESIDUAL AA | RESIDUAL ST |
|---|---|---|---|---|
| 1:1 (Ex. 10A) | 3:1 | $(NH_4)_2S_2O_8$ | 6.3% | 2.16% |
| 1:1 (Ex. 11) | 3:1 | AMPN | 1.29% | 15.05% |

The polymer obtained from Example 11 shows very poor styrene conversion thus illustrating the ineffectiveness of this type of catalyst addition. The example also illustrates the varied effect produced by continuous feed vs. batch process in the same 3:1 IPA/$H_2O$ media.

EXAMPLE 12

111.77 Parts of styrene, 64.44 parts of acrylic acid, 190 parts of isopropanol and 60 parts of water are charged to an appropriate reaction vessel as described in Example 1 and sparged with $N_2$ for a 1 hr. while testing to reflux. A 20% solution of ammonium persulfate is charged as follows: 2.0 parts at t=0; 1.25 parts at t=100 min.; 0.5 part at t=150 min.; 1.25 parts at 180 min. and 2.0 parts at 210 min. The polymer mixture is then stripped and neutralized simultaneously with $NH_4OH$.

The resulting polymer is a hazy to clear solution performing as shown in Table VI, below, when applied in the sizing of paper as described in Example 6, above. A comparison with commercially employed sizes is also made.

TABLE VI

| POLYMER | INK PENETRATION RESULTS | |
|---|---|---|
| | 2#/T (sec.) | 4#/T (sec.) |
| Styrene/Maleic Anhydride (50/50) | 103 | 67 |
| Polyurethane Size | 198 | 286 |
| Blank | 40 | — |
| Example 12 | 302 | 359 |

EXAMPLE 13

(Comparative)

A suitable reaction vessel is fitted as per Example 5. A charge (A) consisting of 60 parts of $H_2O$ and 4.0 parts of the sodium salt of sulfated 4-ethyleneoxynonylphenyl ether (SEONE) is added and the temperature is then raised to 40° C. during a 1 hr. nitrogen sparge. A second charge (B) comprising 10 parts of water, 0.48 part of $K_2S_2O_8$ and sodium meta bisulfite (0.24 part) is added to the reaction and the $N_2$ sparge continues. A charge (C) of 108.0 parts of water, 8.0 parts of SEONE, 7.0 parts of nonylphenylethoxy alcohol and 1.12 parts of $K_2S_2O_8$ is sparged but not added to the reaction. A charge (D) of 8.61 parts of styrene and 67.42 parts of methyl acrylate is added to charge C. Then the mixture of both charges C and D are emulsified. An initiator charge of 20 parts of deionized water and 0.56 part of sodium metabisulfite is sparged 1 hr.

The combined emulsified charge of C and D is added to the reaction mixture over a one hour time period concurrent with the initiator charge added at 0.2 part/min.

The resulting polymer emulsion is stable at pH 5.2 and has a bluish tinge indicating small particle size. Attempts to hydrolyze the polymer to the corresponding acid/Na salt produce a broken emulsion. The polymer provides no sizing when attempts are made to size paper with the emulsion according to the process of Example 6.

EXAMPLE 14

(Comparative)

Using a reactor equipped as described in Examples 4 and 12, a heel charge (A) composed of 84.75 parts of water, 1.52 parts of SPEE and 2.84 parts of ESA is added to the reactor, sparged with $N_2$ for 45 min. and raised in temperature to 81° C. An initiator charge (B) of 30 parts of water, and 1.76 parts of ammonium persulfate is sparged with $N_2$ separately. A charge (C) of 9.37 parts of water and 9.37 parts of acrylic acid is added to the sparging material in the heel. An initiator charge (D) of 30 parts of water and 1.76 parts of ammonium persulfate is sparged with $N_2$ separately for 1 hr. at the rate of 0.2 part/min., to begin the reaction and is added at the same rate over a 3 hr. period. A charge (E) of 104.15 parts of styrene, 62.0 parts of acrylic acid, 1.52 parts of SPEE, 1.42 parts of ESA and 107.89 parts of water is sparged 1 hr. in an addition funnel and then added slowly starting 10 min. after initiation of the heel charges and continuing for 3 hrs. Forty minutes after initiation, 40 parts of isopropyl alcohol are slowly added to the reaction mixture.

The resulting polymer is an unstable emulsion which precipitates when adjusted with NaOH to form the sodium salt. When applied to a paper sheet in an attempt to size the sheet, the polymer is ineffective.

TABLE VII

| | Summary of Performance Of the Examples Performance as Ink Penetration Time Reported as % of Examples 1 and 2 | |
|---|---|---|
| EXAMPLE | DESCRIPTION | % |
| 1 | Vacuum Distillation; ST/MAA 1:1) | 100 |
| 2 | Atmospheric/Steam Distillation; ST/MAA (1:1) | 100 |
| 4 | t-Butanol as Solvent Replacing IPA Same Monomer System and Process | 43 |
| 5 | Emulsion Polymerization of ST/MAA (1:1) | 1 |
| 6 | See Table II for Data Comparison | — |
| 7 | 90% Neutralized ST/MAA (1:1) | 95 |
| 8 | See Table III for Data Comparison | — |
| 9 | Bulk Polymerization ST/MAA (1:1) | 57 |
| 12 | See Table VI for Data Comparison | — |

EXAMPLE 15

The procedure of Example 1 is again followed except that the styrene is replaced by 2-methylstyrene. Similar results are achieved in both polymer characteristics and sizing effects.

EXAMPLE 16

Again following the procedure of Example 1, p-chlorostyrene is used in lieu of styrene. A polymer of substantially equivalent characteristics and sizing ability is recovered.

EXAMPLE 17

The procedure of Example 8 is followed except that the methylmethacrylate monomer is replaced by vinyl acetate.

EXAMPLE 18

Replacement of the isopropanol of Example 2 with ethanol results in the production of a similar polymer with substantially equivalent sizing ability.

EXAMPLE 19

When the procedure of Example 8 is followed with 2.0 weight percent of ethyl acrylate in addition to the other monomers thereof, substantially equivalent results are observed.

EXAMPLE 20

Sec. butanol is used in lieu of isopropanol as in Example 1 to yield a similar polymer of similar sizing efficiency.

EXAMPLE 21

A mixture of styrene and p-methylstyrene (90/10) is copolymerized with acrylic acid as in Example 12. A polymer exhibiting excellent sizing efficiency is recovered.

We claim:

1. A method of surface sizing paper which comprises adding to an alkaline-formed paper sheet a non-alternating, block-free, substantially homogeneous polymer of 1) a monomer having the formula:

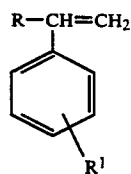

wherein R is hydrogen or $C_1$–$C_4$ alkyl and $R^1$ is hydrogen, halo or $C_1$–$C_4$ alkyl, 2) acrylic or methacrylic acid and 3) optionally, up to about 10%, by weight, based on the total monomer weight, of a hydrophobic monomer different from that represented by said formula, the 1) and 2) monomer units of the polymer being incorporated therein as if the monomers from which said units are derived had reactivity ratios A) nearly equal and B) a product approaching unity, the molar ratio of 1) and 2) ranging from about 1.4:1 to about 1:1.4.

2. A method according to claim 1 wherein R and $R^1$ are both hydrogen.

3. A method according to claim 1 wherein R and $R^1$ are both hydrogen and 2) is methacrylic acid.

4. A method according to claim 2, 2) is methacrylic acid and no monomer 3) is present.

5. Paper surface-sized with a non-alternating block-free, substantially homogeneous polymer of 1) a monomer having the formula:

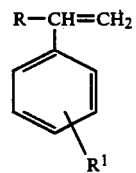

wherein R is a hydrogen or $C_1$–$C_4$ alkyl and $R^1$ is hydrogen halo or $C_1$–$C_4$ alkyl, 2) acrylic or methacrylic acid and 3) optionally, up to about 10%, by weight, based on the total monomer weight, of a hydrophobic monomer different from that represented by said formula, the 1) and 2) monomer units of the polymer being incorporated therein as if the monomers from which said units are delivered had reactivity ratios A) nearly equal and B) a product approaching unity, the molar ratio of 1) to 2) ranging from about 1.4:1 to about 1:1.4.

6. Paper according to claim 5 wherein both R and R' are hydrogen.

7. Paper according to claim 5 wherein both R and R' are hydrogen and no monomer 3) is present.

* * * * *